(12) United States Patent
Wan et al.

(10) Patent No.: US 11,389,912 B1
(45) Date of Patent: Jul. 19, 2022

(54) METHOD FOR SEALING HIGH-TEMPERATURE HEAT PIPE

(71) Applicant: SOUTH CHINA UNIVERSITY OF TECHNOLOGY, Guangzhou (CN)

(72) Inventors: Zhenping Wan, Guangzhou (CN); Zicong He, Guangzhou (CN); Jinhu Zou, Guangzhou (CN); Longsheng Lu, Guangzhou (CN); Yong Tang, Guangzhou (CN)

(73) Assignee: SOUTH CHINA UNIVERSITY OF TECHNOLOGY, Guangzhou (CN)

( * ) Notice: Subject to any disclaimer, the term of this patent is extended or adjusted under 35 U.S.C. 154(b) by 0 days.

(21) Appl. No.: 17/401,327

(22) Filed: Aug. 13, 2021

(51) Int. Cl.
*B23P 15/26* (2006.01)
*F28D 15/02* (2006.01)

(52) U.S. Cl.
CPC ........... *B23P 15/26* (2013.01); *B23P 2700/09* (2013.01); *F28D 15/02* (2013.01); *F28D 15/0283* (2013.01)

(58) Field of Classification Search
CPC .. B23P 15/26; B23P 2700/09; F28D 15/0283; F28D 15/02
See application file for complete search history.

(56) References Cited

U.S. PATENT DOCUMENTS

| | | | | |
|---|---|---|---|---|
| 3,769,674 A * | 11/1973 | Droughton | ............... | F28D 15/04 29/890.032 |
| 6,230,407 B1 * | 5/2001 | Akutsu | ............... | F28D 15/0233 29/890.032 |
| 6,957,691 B2 * | 10/2005 | Hsieh | ................... | F28D 15/0283 165/104.21 |
| 7,275,409 B1 * | 10/2007 | Wu | ...................... | F28D 15/0283 29/890.032 |
| 7,404,255 B2 * | 7/2008 | Li | ........................ | F28D 15/0258 165/104.19 |
| 7,430,803 B2 * | 10/2008 | Li | ....................... | F28D 15/0283 165/104.19 |
| 7,538,298 B2 * | 5/2009 | Li | ....................... | F28D 15/0283 29/890.032 |
| 7,650,915 B2 * | 1/2010 | Hsu | ......................... | F28D 15/00 29/890.032 |

(Continued)

FOREIGN PATENT DOCUMENTS

| | | |
|---|---|---|
| CN | 1854668 A | 11/2006 |
| CN | 101799249 A | 8/2010 |

(Continued)

*Primary Examiner* — Jason L Vaughan
(74) *Attorney, Agent, or Firm* — True Shepherd LLC; Andrew C. Cheng

(57) ABSTRACT

A method for sealing a high-temperature heat pipe includes: (1) necking and reducing two ends of the heat pipe separately, so as to obtain a necked end and a reduced end; (2) sealing the necked end by laser welding or electron beam welding; (3) placing the heat pipe in an inert gas glove box, and pouring a working medium without impurities into the heat pipe; (4) heating the heat pipe, connecting the reduced end to a vacuum pump, pumping gas inside the heat pipe by the vacuum pump to vacuumize the heat pipe, such that pressure in an inner cavity of the heat pipe reaches a target pressure, and flattening the reduced end; and (5) sealing an opening of the flattened reduced end by electron beam welding or laser welding, so as to obtain the high-temperature heat pipe.

10 Claims, 3 Drawing Sheets

(56) References Cited

U.S. PATENT DOCUMENTS

| | | | |
|---|---|---|---|
| 8,650,755 B2 * | 2/2014 | Lee | B23P 15/26 29/890.032 |
| 10,016,857 B2 * | 7/2018 | Shen | F28D 15/04 |
| 10,168,104 B2 | 1/2019 | Kang et al. | |
| 10,508,379 B2 | 12/2019 | Lowe | |
| 11,085,564 B2 | 8/2021 | Edwards et al. | |
| 2002/0178561 A1 * | 12/2002 | Huang | F28D 15/0283 428/36.9 |
| 2004/0194311 A1 * | 10/2004 | Hsu | F28D 15/0283 29/890.032 |
| 2006/0117565 A1 * | 6/2006 | Li | F28D 15/0283 29/890.032 |
| 2006/0162160 A1 * | 7/2006 | Hsu | F28D 15/0283 29/890.032 |
| 2009/0020268 A1 * | 1/2009 | Chang | F28D 15/046 165/104.33 |
| 2013/0048247 A1 * | 2/2013 | Lin | B21C 37/154 29/890.032 |

FOREIGN PATENT DOCUMENTS

| | | |
|---|---|---|
| CN | 102829658 A | 12/2012 |
| CN | 204085271 U | 1/2015 |
| CN | 109141086 A | 1/2019 |
| CN | 109940343 A | 6/2019 |
| CN | 110411253 A | 11/2019 |
| JP | S57142485 A | 9/1982 |

\* cited by examiner

METHOD FOR SEALING HIGH-TEMPERATURE HEAT PIPE

CROSS-REFERENCE TO RELATED APPLICATIONS

This application is a continuation of International Patent Application No. PCT/CN2020/119392 with a filing date of Sep. 30, 2020, designating the United States, now pending, and further claims priority to Chinese Patent Application No. 202010510277.4 with a filing date of Jun. 8, 2020. The content of the aforementioned applications, including any intervening amendments thereto, are incorporated herein by reference.

TECHNICAL FIELD

The present disclosure belongs to the technical field of high-temperature thermal structures, and particularly relates to a method for sealing a high-temperature heat pipe.

BACKGROUND

Heat pipes can be divided into the low-temperature heat pipes (operating at −270° C. to 0° C.), the normal-temperature heat pipes (operating at 200° C. to 600° C.) and the high-temperature heat pipes (operating at 600° C. or above) according to their use temperatures. Since the high-temperature heat pipes operate at extremely high temperatures, a passive heat transfer mode is applied extensively in the fields of aerospace, nuclear electric power generation and military industry. With liquid metal or molten salt as a working medium, the high-temperature heat pipes have good thermal stability and low saturated vapor pressure at high temperatures. The high-temperature heat pipes are made of stainless steel, high-temperature alloys or refractory metal.

When the high-temperature heat pipes made of refractory alloys are sealed, tube bodies and end caps are combined, and valves need to be added at the end caps for subsequent pouring and vacuum degassing, which is complicated. Part of the refractory metal has high hardness and high brittleness, and thus is difficult to machine. In addition, it is difficult and costly to manufacture valves with end caps, thereby limiting the manufacturing efficiency of the high-temperature heat pipes.

SUMMARY

The technical problem to be solved by the present disclosure is to overcome the defect of a complicated process for manufacturing a high-temperature heat pipe in the prior art. The present disclosure provides a method for sealing a high-temperature heat pipe, which may reduce cost and improve manufacturing efficiency.

In order to solve the above technical problem, the present disclosure employs the technical solution: the method for sealing a high-temperature heat pipe includes:

(1) necking and reducing two ends of the heat pipe separately, so as to obtain a necked end and a reduced end;

(2) sealing the necked end by laser welding or electron beam welding;

(3) placing the heat pipe in an inert gas glove box, and pouring a working medium without impurities into the heat pipe;

(4) heating the heat pipe, connecting the reduced end to a vacuum pump, pumping gas inside the heat pipe by the vacuum pump to vacuumize the heat pipe, such that pressure in an inner cavity of the heat pipe reaches a target pressure, and flattening the reduced end; and (5) sealing an opening of the flattened reduced end by electron beam welding or laser welding, so as to obtain the high-temperature heat pipe.

Preferably, step (1) of reducing one end of the heat pipe includes:

(1-1-1) fixing the heat pipe to a fixture of a lathe, and mounting a spinning reducing die in the lathe; and (1-1-2) driving the spinning reducing die to rotate, and simultaneously driving the heat pipe to move toward the die axially so as to insert the heat pipe into the spinning reducing die, so as to reduce one end of the heat pipe.

Preferably, the spinning reducing die includes a retainer and a plurality of steel balls, where the steel balls are fixed in the retainer, so as to form a reducing hole.

Preferably, step (1) of necking the other end of the heat pipe includes:

(1-2-1) fixing the heat pipe to a fixture of a lathe, and mounting a spinning necking die in a lathe chuck; and (1-2-2) driving the spinning necking die to rotate, and simultaneously driving the heat pipe to move toward the die axially so as to insert the heat pipe into the spinning necking die, so as to neck the other end of the heat pipe.

Preferably, the spinning necking die in step (1) includes an upper pressing die and a lower pressing die, where a first groove is provided in one side of the upper pressing die, a second groove is provided in one side of the lower pressing die, the upper pressing die and the lower pressing die are spliced, and the first groove and the second groove are spliced to form a necking groove.

Preferably, in step (4), after vacuumizing, the pressure of the inner cavity of the heat pipe is lower than $1\times10^{-3}$ Pa.

Preferably, in step (1), after reducing, an outer diameter of the heat pipe is 6-8 mm.

Preferably, the method further includes: cleaning to remove surface oxide skin and lubricating oil of the heat pipe subjected to necking and reducing between step (1) and step (2).

Preferably, in step (3), a water content and an oxygen content of the inert gas glove box are both lower than 0.5 ppm.

Preferably, after step (5), the method further includes: placing the high-temperature heat pipe in a pressure maintaining container with high-pressure helium for at least 2 hours, then vacuumizing the pressure maintaining container, and checking the quantity of the helium left in the pressure maintaining container, where when partial pressure of the helium in the pressure maintaining container is less than $1\times10^{-3}$ Pa, the high-temperature heat pipe is qualified.

The present invention has the beneficial effects:

1. by necking and reducing the two ends of the heat pipe separately, and sealing the necked end of the heat pipe by laser welding or electron beam welding, the working procedures for manufacturing the high-temperature heat pipe are simplified and the cost is reduced; and 2. by flattening the reduced end of the vacuumized heat pipe, the opening is rapidly and temporarily sealed; and by sealing the opening of the flattened reduced end by electron beam welding or laser welding, non-condensable gas in the high-temperature heat pipe is effectively reduced, and the working medium is prevented from being oxidized, so as to obtain the high-temperature heat pipe with good gas tightness.

Figure 1:
FIG. 1 is a schematic diagram of a heat pipe of the present disclosure.

Numerals of various components in the figures: 1. heat pipe, 2. inert gas glove box, 3. electric hydraulic clamp, 4. working medium, 5. tubular heating furnace, 6. electron beam welding or laser welding; 7. spinning reducing die, 7-1 retainer, 7-2 steel ball, 7-3 reducing hole; 8. spinning necking die, 8-1 upper pressing die, 8-2 lower pressing die, 8-3 necking groove, 8-3-1 first groove, 8-3-2 second groove.

DETAILED DESCRIPTION OF THE EMBODIMENTS

The objects of the present disclosure will be further described in detail below with reference to the accompanying drawings and specific embodiments, not all of the embodiments can be described in detail herein, but the implementations of the present disclosure are not therefore limited to the following embodiments.

Embodiment 1

As shown in FIGS. 1-7, a method for sealing a high-temperature heat pipe, provided in the present disclosure, includes:

(1) neck and reduce two ends of the heat pipe 1, so as to obtain a necked end and a reduced end, such that subsequent flattening sealing and welding sealing are facilitated; clean to remove surface oxide skin and lubricating oil of the heat pipe 1 subjected to necking and reducing such that non-condensable gas of the high-temperature heat pipe may be effectively reduced, and the surface oxide skin and the lubricating oil may be prevented from affecting strength of subsequent flattening and welding.

(2) seal the necked end by laser welding or electron beam welding 6;

(3) keep a water content and an oxygen content in an inert gas glove box 2 lower than 0.5 ppm, then place the heat pipe 1 in the inert gas glove box 2 to prevent a working medium 4 from being oxidized in a pouring process, and pour the working medium 4 without impurities into the heat pipe 1;

(4) heat the heat pipe 1 by a tubular heating furnace 5; connect the reduced end to a vacuum pump; pump gas inside the heat pipe 1 by the vacuum pump to vacuumize the heat pipe, such that pressure of an inner cavity of the heat pipe 1 is lower than $1\times10^{-3}$ Pa; then flatten the reduced end by an electric hydraulic clamp 3, where a tonnage of the electric hydraulic clamp 3 is larger than 12 T, and a radius of a cutting edge of a flattening grinding tool is smaller than 10 mm; and enable a heating temperature to be higher than a melting point of the working medium 4, and carry out melting at a high temperature to quickly discharge impurity gas in the working medium;

(5) seal an opening of the flattened reduced end by electron beam welding or laser welding 6, so as to obtain the high-temperature heat pipe;

(6) place the high-temperature heat pipe in a pressure maintaining container with high-pressure helium for at least 2 hours, where pressure of the high-pressure helium in this embodiment is 0.3-0.4 MPa; then vacuumize the pressure maintaining container; and check the quantity of the helium left in the pressure maintaining container, where when partial pressure of the helium in the pressure maintaining container is less than $1\times10^{-3}$ Pa, the high-temperature heat pipe is qualified.

In step (1), after reducing, an outer diameter of the heat pipe 1 is 6 mm.

In step (3), inert gas used in the inert gas glove box is argon.

In step (4), the heating temperature is 250° C., and a length of a heated section of the heat pipe 1 is 100 mm.

The heat pipe 1 is made of a nickel-base high-temperature alloy, and the working medium 4 sealed in the pipe is alkali metal. A groove type capillary structure is designed on an inner wall of the heat pipe 1. The capillary structure may reduce backflow resistance of the liquid metal working medium 4 and increase anti-gravity performance when the high-temperature heat pipe works. The groove type capillary structure is manufactured by spinning, has high machining efficiency, and is capable of effectively reducing the backflow resistance of the liquid metal working medium 4.

Figure 3:
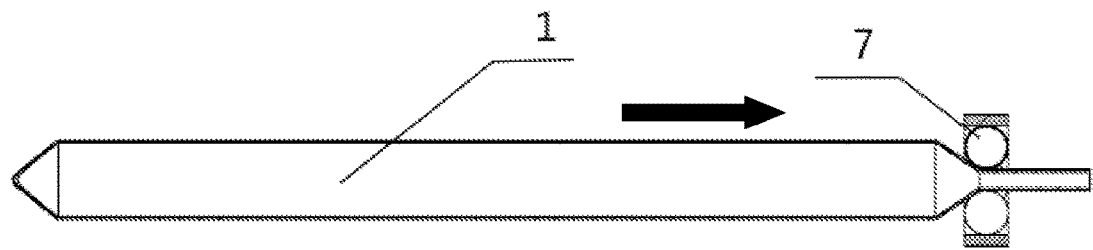
FIG. 3 is a schematic diagram of a spinning reducing operation in the present disclosure, and an arrow in the figure represents a feed direction.

As shown in FIG. 3, step (1) of reducing one end of the heat pipe 1 includes:

(1-1-1) fix the heat pipe 1 to a fixture of a lathe, and mount a spinning reducing die 7 in the lathe; and (1 1 2) drive the spinning reducing die 7 to rotate, and simultaneously drive the heat pipe 1 to move toward the die axially so as to insert the heat pipe 1 into the spinning reducing die 7, where a diameter of one end of the heat pipe 1 becomes smaller along with reduction of a diameter of a reducing hole 7-3 of the spinning reducing die 7, and after the diameter of one end of the heat pipe is 6 cm, the diameter of the reducing hole 7-3 of the spinning reducing die 7 is kept unchanged until the reduced end of the heat pipe is obtained.

Figure 2:
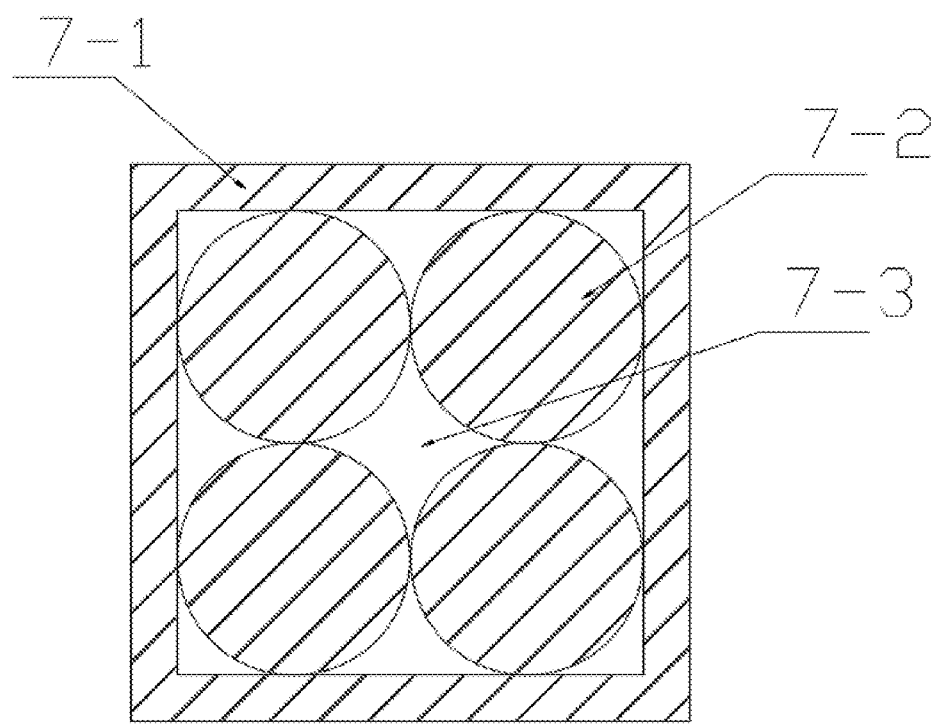
FIG. 2 is a schematic diagram of a spinning reducing die of the present disclosure.

As shown in FIG. 2, the spinning reducing die 7 in step (1) includes a retainer 7-1 and a plurality of steel balls 7-2, where the plurality of steel balls 7-2 are fixed in the retainer 7-1, so as to form the reducing hole 7-3.

Figure 5:
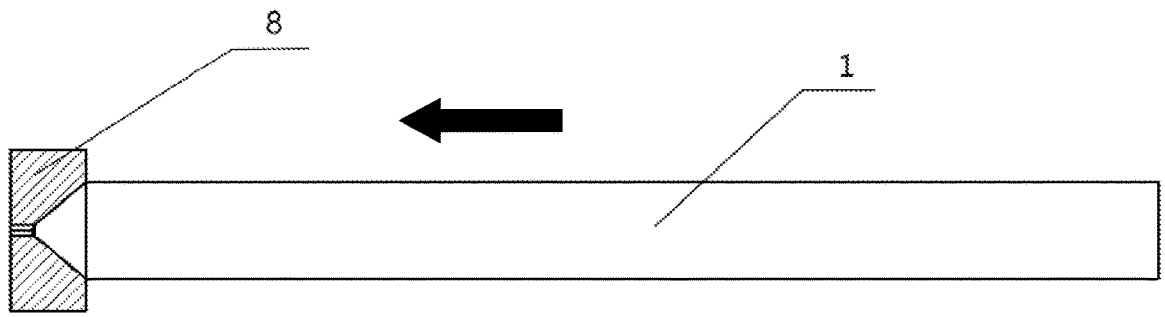
FIG. 5 is a schematic diagram of a spinning necking operation in the present disclosure, and an arrow in the figure represents a feed direction.
Figure 6:
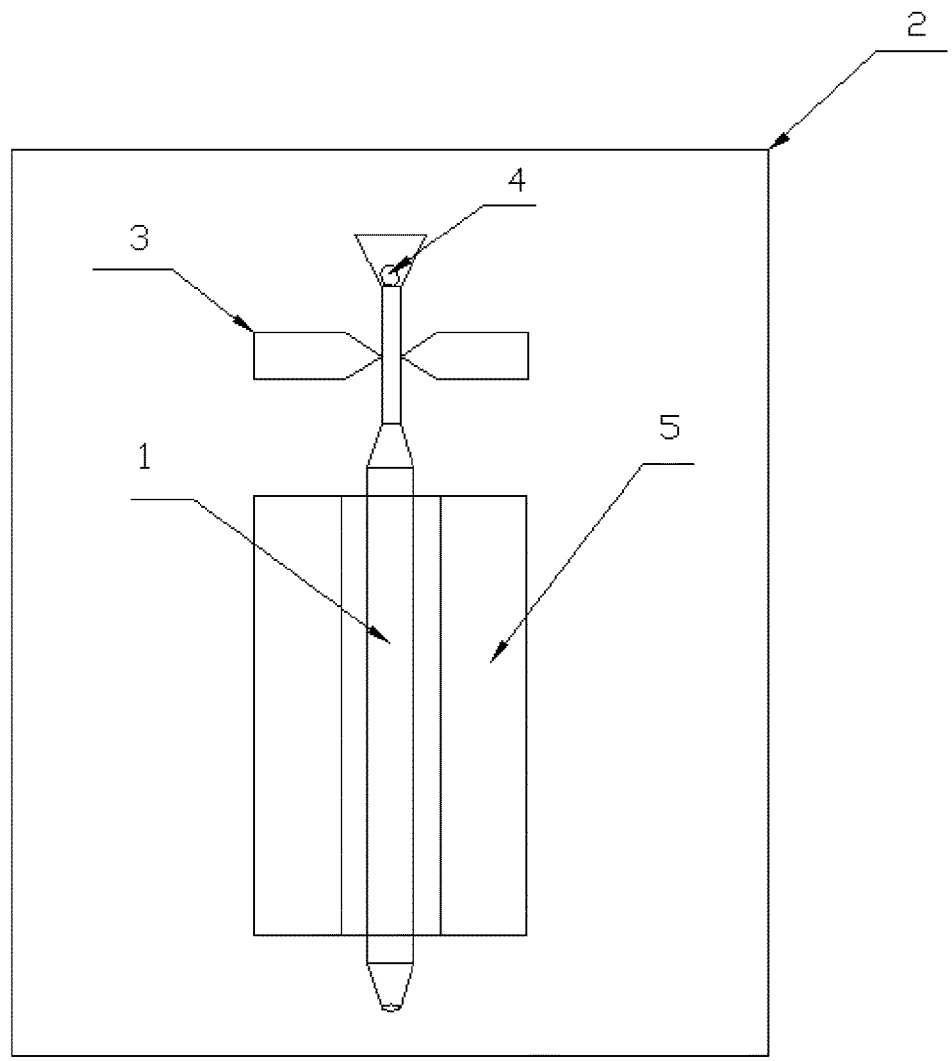
FIG. 6 is a schematic diagram of a working medium pouring and sealing process of the heat pipe in the present disclosure.
Figure 7:
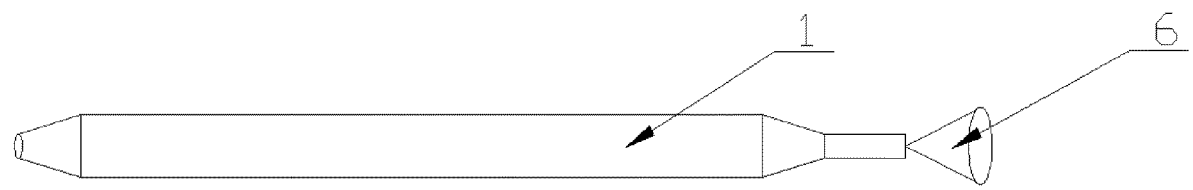
FIG. 7 is a schematic diagram of sealing the heat pipe by electron beam welding or laser welding in the present disclosure.

As shown in FIG. 5, in step (1) of necking the other end of the heat pipe 1 includes:

(1-2-1) fix the heat pipe 1 to a fixture of a lathe, and mount a spinning necking die 8 in a lathe chuck; and (1-2-2) drive the spinning necking die 8 to rotate, and simultaneously drive the heat pipe 1 to move toward the die axially so as to insert the heat pipe 1 into a necking groove of the spinning necking die 8, where a wall at the other end of the heat pipe is deformed along with rotation of the necking groove until the other end of the heat pipe is sealed by necking.

Figure 4:
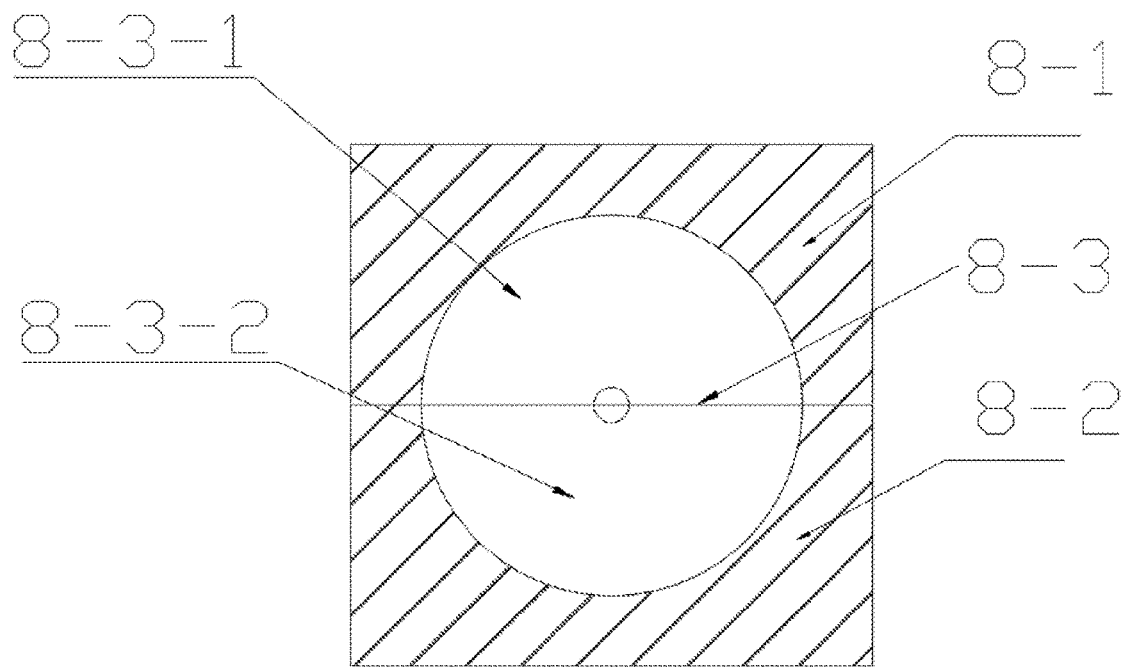
FIG. 4 is a schematic diagram of a spinning necking die of the present disclosure.

As shown in FIG. 4, the spinning necking die 8 in step (1) includes an upper pressing die 8-1 and a lower pressing die 8-2, where a first groove 8-3-1 is provided in one side of the upper pressing die 8-1, a second groove 8-3-2 is provided in one side of the lower pressing die 8-2, the upper pressing die 8-1 and the lower pressing die 8-2 are spliced, and the first groove 8-3-1 and the second groove 8-3-2 are spliced to form the necking groove 8-3.

Embodiment 2

In this embodiment, the following technical features are different from those of Embodiment 1, and the other technical features are the same.

In step (1), after reducing, an outer diameter of a heat pipe 1 is 7 mm.

In step (3), inert gas used in an inert gas glove box is helium.

In step (4), a heating temperature is 275° C., and a length of a heated section of the heat pipe 1 is 200 mm.

The heat pipe 1 is made of a molybdenum alloy, and a working medium 4 sealed in the pipe is molten salt. A wire mesh type capillary structure is designed on an inner wall of the heat pipe 1. The wire mesh type capillary structure is easy to manufacture and has certain anti-gravity performance.

Embodiment 3

In this embodiment, the following technical features are different from those of Embodiment 1, and the other technical features are the same.

In step (1), after reducing, an outer diameter of a heat pipe 1 is 8 mm.

In step (4), a heating temperature is 300° C., and a length of a heated section of the heat pipe 1 is 300 mm.

The heat pipe 1 is made of a niobium alloy. A powder sintered capillary structure is designed on an inner wall of the heat pipe 1. The powder sintered capillary structure has high anti-gravity performance.

The above specific implementations are preferred embodiments of the present disclosure and may not be construed as limiting the present disclosure, and any other changes or equivalent substitutions without departing from the technical solution of the present disclosure are included in the protection scope of the present disclosure.

What is claimed is:

1. A method for sealing a high-temperature heat pipe, comprising:
   (1) necking and reducing two ends of the heat pipe separately, so as to obtain a necked end and a reduced end;
   (2) sealing the necked end by laser welding or electron beam welding;
   (3) placing the heat pipe in an inert gas glove box, and pouring a working medium into the heat pipe;
   (4) heating the heat pipe, connecting the reduced end to a vacuum pump, pumping gas inside the heat pipe by the vacuum pump to vacuumize the heat pipe, such that pressure in an inner cavity of the heat pipe reaches a target pressure, and flattening the reduced end; and
   (5) sealing an opening of the flattened reduced end by electron beam welding or laser welding, so as to obtain the high-temperature heat pipe.

2. The method according to claim 1, wherein step (1) of reducing one end of the heat pipe comprises:
   (1-1-1) fixing the heat pipe to a fixture of a lathe, and mounting a spinning reducing die in the lathe; and
   (1-1-2) driving the spinning reducing die to rotate, and simultaneously driving the heat pipe to move toward the spinning reducing die axially so as to insert the heat pipe into the spinning reducing die, so as to reduce one end of the heat pipe.

3. The method according to claim 2, wherein the spinning reducing die comprises a retainer and a plurality of steel balls, wherein the plurality of steel balls are fixed in the retainer, so as to form a reducing hole.

4. The method according to claim 1, wherein step (1) of necking the other end of the heat pipe comprises:
   (1-2-1) fixing the heat pipe to a fixture of a lathe, and mounting a spinning necking die in a lathe chuck; and
   (1-2-2) driving the spinning necking die to rotate, and simultaneously driving the heat pipe to move toward the spinning necking die axially so as to insert the heat pipe into the spinning necking die, so as to neck the other end of the heat pipe.

5. The method according to claim 4, wherein the spinning necking die in step (1) comprises an upper pressing die and a lower pressing die, wherein a first groove is provided in one side of the upper pressing die, a second groove is provided in one side of the lower pressing die, the upper pressing die and the lower pressing die are spliced, and the first groove and the second groove are spliced to form a necking groove.

6. The method according to claim 1, wherein in step (4), after vacuumizing, the pressure of the inner cavity of the heat pipe is lower than $1\times10^{-3}$ Pa.

7. The method according to claim 1, wherein in step (1), after reducing, an outer diameter of the heat pipe is 6-8 mm.

8. The method according to claim 1, further comprising: cleaning to remove surface oxide skin and lubricating oil of the heat pipe subjected to necking and reducing between step (1) and step (2).

9. The method according to claim 1, wherein in step (3), a water content and an oxygen content of the inert gas glove box are both lower than 0.5 ppm.

10. The method according to claim 1, wherein after step (5), the method further comprises: placing the high-temperature heat pipe in a pressure maintaining container with high-pressure helium for at least 2 hours, then vacuumizing the pressure maintaining container, and checking a quantity of the helium left in the pressure maintaining container, wherein when partial pressure of the helium in the pressure maintaining container is less than 1×10-3 Pa, the high-temperature heat pipe is qualified.

* * * * *